United States Patent [19]

Blossey

[11] 4,121,261
[45] Oct. 17, 1978

[54] SYNCHRONOUS HELICAL SCAN-HELICAL RECORD MAGNETIC IMAGING

[75] Inventor: Daniel F. Blossey, Rochester, N.Y.

[73] Assignee: Xerox Corporation, Stamford, Conn.

[21] Appl. No.: 791,892

[22] Filed: Apr. 28, 1977

[51] Int. Cl.² .......................... H04N 1/24; G11B 5/43
[52] U.S. Cl. .................................. 358/301; 346/74.1; 360/26; 360/36; 358/298
[58] Field of Search ............... 358/301, 290, 298, 296, 358/283; 346/74.1; 360/84, 36, 51, 26

[56] References Cited

U.S. PATENT DOCUMENTS

| 2,170,751 | 8/1939 | Gabvilovitch | 360/84 |
| 2,826,634 | 3/1958 | Atkinson et al. | 358/301 |
| 2,901,309 | 8/1959 | Atkinson et al. | 358/301 |
| 3,016,416 | 1/1962 | Johnson | 358/301 |
| 3,600,507 | 8/1971 | Newgard | 358/290 |

*Primary Examiner*—Raymond F. Cardillo, Jr.
*Attorney, Agent, or Firm*—G. J. Cannon; J. J. Ralabate

[57] ABSTRACT

An electronically controlled magnetic recorder for rapidly optically scanning an original document and for producing a latent magnetic image thereof. The recorder comprises directly coupled helical optical scanning and helical magnetic writing.

4 Claims, 13 Drawing Figures

BLOCK DIAGRAM OF PHASE LOCKED LOOP CIRCUIT

TIMING DIAGRAM OF LOAD/UNLOAD CYCLES
(ONE REVOLUTION OF HEAD WHEEL)

SYNCHRONOUS HELICAL SCAN-HELICAL RECORD MAGNETIC IMAGING

BACKGROUND OF THE INVENTION

This invention relates to magnetic imaging, and more particularly to a magnetic scanner-recorder for optical helical scanning of a document with the scanner interfaced with magnetic helical writing through electronic circuitry.

The recordation of magnetic signals upon a magnetizable member such as magnetic tape is known. Recorded magnetic signals are used extensively in audio tape recordings, in magnetic video recording as indicated in U.S. Pat. Nos. 3,108,281 and 3,862,355.

To obtain faster recording, it was found desirable to move the magnetic recording head and magnetizable medium relative to one another both circumferentially and axially during the writing process, as disclosed in U.S. Pat. No. 2,850,348 for magnetic drum printing and as shown in U.S. Pat. No. 3,845,500 for a rotating magnetic head about which a magnetic tape is helically wrapped during its path of travel.

The magnetic reproduction of hard copy original images has theretofore been limited substantially to rather cumbersome techniques involving intermediates such as the use of an optical mask for thermoremanent or Curie-point imaging; or, the use of a xerographically formed intermediate image which is magnetized and used as a master for either direct development with magnetic toner or for transfer of its pattern of magnetization to a magnetic tape via Curie-point techniques. Alternatively, rather cumbersome techniques requiring the mounting of an original image onto a rotating mandral such as is shown in U.S. Pat. No. 2,826,634 have been required.

SUMMARY OF THE INVENTION

Therefore, an object of this invention is to overcome the above noted deficiencies.

Another object of this invention is to provide a magnetic recorder having rapid optical scanning capability of an original hard copy.

A further object of this invention is to provide a novel scanning magnetic recorder.

Another object of this invention is to provide real-time synchronization of the scanning and the recording operations in both the longitudinal and transverse scanning and recording directions.

In accordance with the present invention, these and other objects are achieved by a magnetic recorder comprising a transparent cylinder within which is located an optical scanning element positioned to optically scan an original document transported around the circumference of said transparent cylinder in helical-wrap configuration; a second cylinder in substantial longitudinal alignment with said transparent cylinder and within which is located a rotational member having at least one magnetic record head mounted thereon, said rotational member positioned within said second cylinder to magnetically record a magnetizable member transported around the circumference of said record cylinder in helical-wrap configuration; means for rotating said optical scanning element and said rotational member without substantial translation thereof; and means for converting signals from said optical scanning element into reversals of electric current flow through said at least one record head.

DETAILED DESCRIPTION OF THE PREFERRED EMBODIMENT

Figure 1:
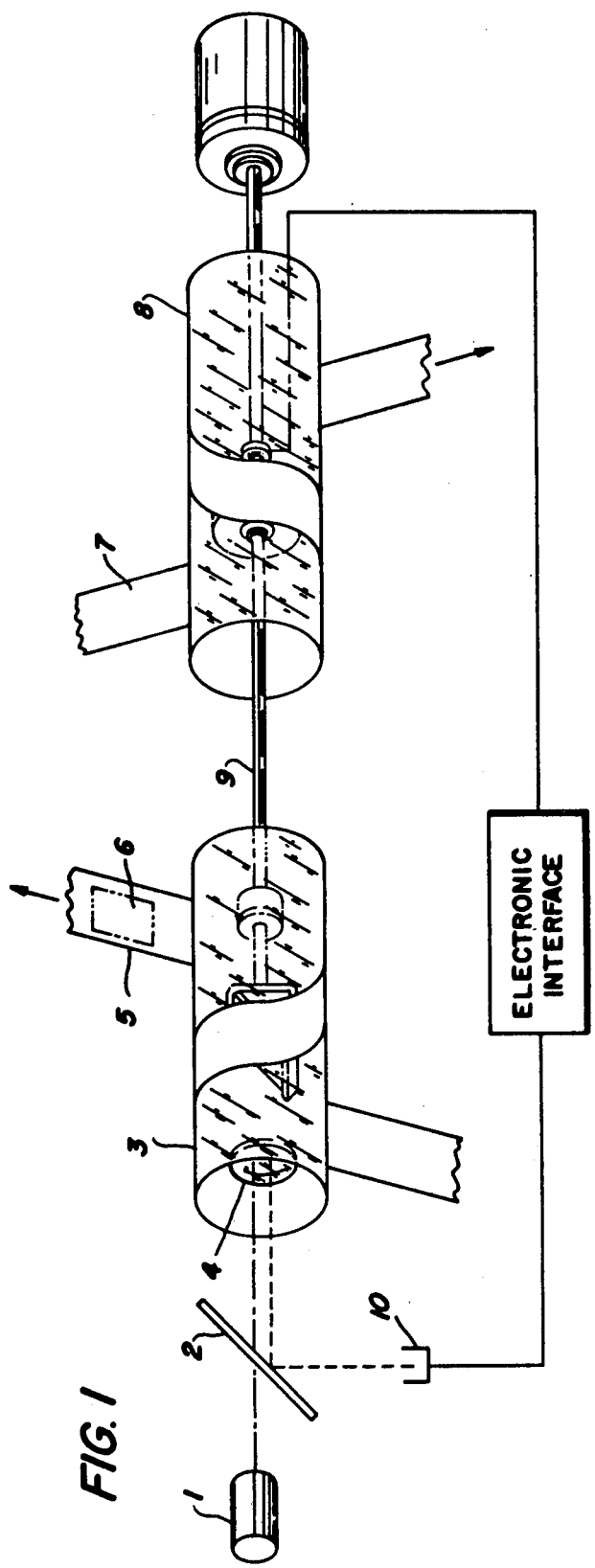
FIG. 1 is a schematic illustration of one embodiment of the coupled helical scan-helical record magnetic recorder of the present invention.
Figure 2:
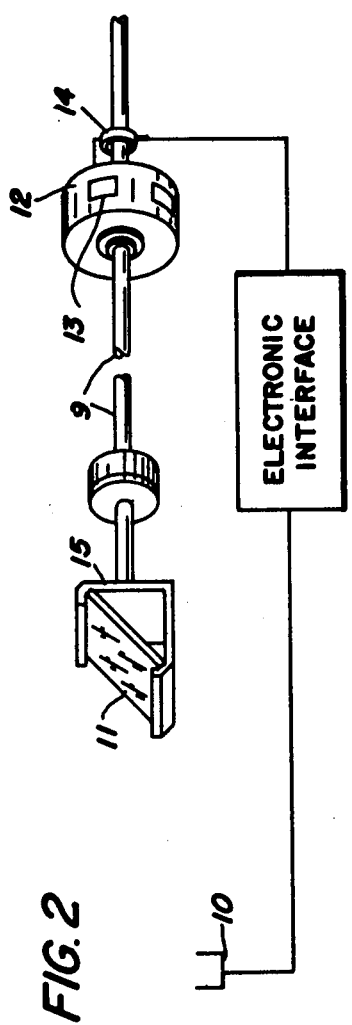
FIG. 2 is a schematic illustration of one embodiment of an optical scanning element and a magnetic record head suitable for use in the present invention.

Referring now to FIGS. 1 and 2, there is seen a transparent cylinder 3 within which is located an optical scanning element 11 positioned to optically scan original document 6 carried by document transport web 5 around the circumference of transparent cylinder 3. Laser or light source 1 directs a beam of light through one way mirror 2 which beam is focused by lens 4 upon optical scanning element 11. Element 11 can conveniently comprise a mirrored surface oriented at about 45° relative to the light beam from laser or light source 1. The beam is directed by element 11 through transparent cylinder 3, strikes original document 6 (when document 6 is in helical-wrap configuration around transparent cylinder 3) and is either reflected heavily by white or light portions of document 6 or absorbed heavily by black or dark portions of document 6. Light reflected from document 6 strikes element 11, is focused by lens 4 and is reflected from the mirrored surface of one-way mirror 2 into photo-detector or photo-voltaic device 10. The electrical signal produced by photo-detector 10 is proportional to the amount of light striking it.

Scanning element 11 is rotatably connected to shaft 9 by gear box 16 and, as element 11 rotates, the beam of light from source 1 is rotated in a plane orthogonal to the surface of transparent cylinder 3. Thus, the beam traces a circle around the circumference of transparent cylinder 3 and scans original document 6 in a line tilted with respect to the axes of document 6 (major and minor). This tilt is caused by the angular movement of document 6 around the circumference of transparent cylinder 3 in a helical-wrap configuration. Gear box 16 contains gears chosen to rotate scanning element 11 at a multiple of the RPM of rotational member 12, the multiple factor being equal to the number of recording heads 13 equidistantly spaced along the circumference of rotational member 12. Document transport web 5, and original document 6, are transported around transparent cylinder 3 at the same speed but opposite direction as that of magnetic tape 7 around cylinder 8.

As the beam of light from source 1 scans document 6 it is modulated in light intensity due to absorption by the darker portions of document 6. These portions in a positive image are the image areas of document 6; and, in a negative image, are the background areas of document 6. The modulated beam, indicated in FIG. 1 by the broken line reflected into photo-voltaic device 10, comprises optical bits of light varying in intensity in a correspondence with the line of scan on document 6. This variation in intensity is converted by photo-voltaic device 10 into a variation of voltage and current which is converted from analog to digital format by an A/D converter, and fed into the remainder of the electronic interface of FIG. 3. Thus, original document 6 is "read" by optical scanning means and the "read" optical information is converted into electrical signal information.

The electrical signal information is processed by the electronic interface to provide reversals of electric current flow through four magnetic record heads 13 equidistantly mounted upon rotational member 12, via slip rings or rotary transformer 14. When the direction of the current is reversed from its previous direction of flow through the magnetic record heads 13, a magnetic field gradient is generated which is referred to herein as a pixel. These field gradients or pixels are recorded upon magnetizable member 7 which can comprise magnetic tape such as chromium dioxide magnetic tape of a width suitable for the reproduction of original document 6. The lines of recordation of pixels upon magnetizable member 7 by magnetic record heads 13 is commonly referred to as tracks. These recorded tracks correspond to the scanned lines of original document 6, being similarly tilted and constitute the latent magnetic image on tape 7 corresponding to the original image on document 6. By toning the latent magnetic image with magnetic marking material commonly referred to as magnetic toner the latent magnetic image is rendered visible. Thus, a duplicate or copy of original document 6 is created upon transfer of the toned or developed magnetic image to a receiving member such as paper. With transport 5 wrapped as shown in FIG. 1, when magnetic tape 7 is helically-wrapped from bottom left to top right a wrong reading (mirror image) toner developed image resides on the receiver medium after transfer; and, if tape 7 is helically-wrapped from bottom right to top left as in FIG. 1, right-reading toner developed image resides on the receiver medium after transfer. This occurs because of the first in last out organization of the electronic data buffer. If the line buffers are unloaded in the last-in, first-out sequence, then tape 7 is transported in the opposite direction to that of transport 5. Conversely, if the line buffers are unloaded in the first-in, first-out sequence, tape 7 and transport 5 are transported in the same direction.

While the embodiment depicted in FIGS. 1 and 2 is for an optical scanner having a single light beam and four magnetic record heads, it will be appreciated that other variations in optical scanning can be employed. For example, a polyhedral scanning element having the same number of faces as the number of magnetic record heads can be employed and directly coupled to shaft 9, eliminating gear box 16. In this case, a separate light source and photo-voltaic device is used for each face of the polyhedral element and each face is oriented 45° with respect to the light beam striking it.

Document transport 5 and magnetic tape 7 are transported at the same speed around their respective cylinders. The electronic interface depicted in FIGS. 3-14 will accommodate either of the aforementioned scanning modes with the result that real-time synchronization between optical scanning and latent magnetic imaging occurs. As depicted, the electronic interface can handle four record heads. More or less can be handled by a similarly constructed circuit by addition or substraction of data buffers and substitution of larger or smaller capacity control logic for the number of buffers used.

Figure 3:
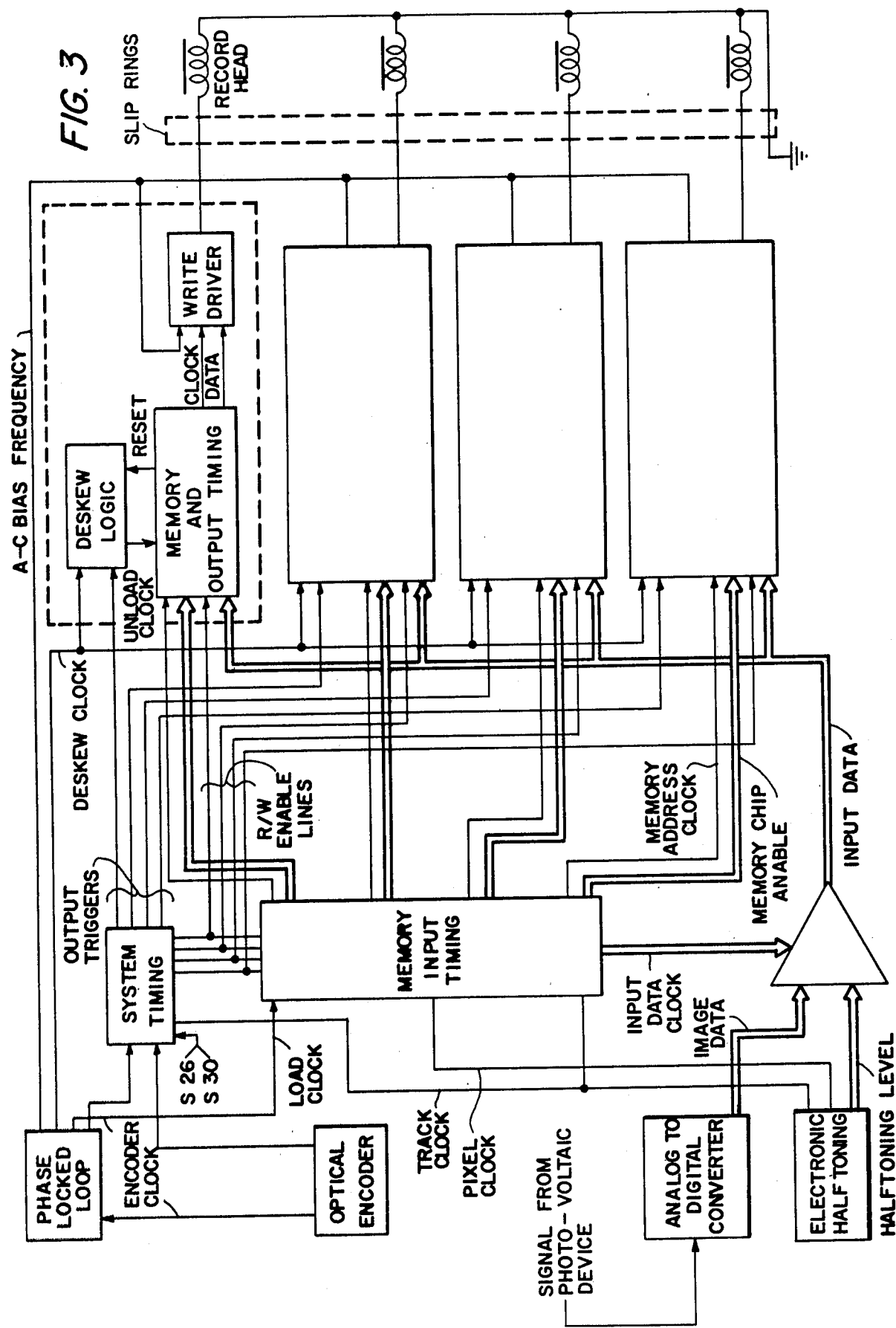
FIG. 3 is a block diagram of an electronic interface suitable for use in the present invention.

Referring now to FIG. 3, there is seen a block diagram of the electronic interface between the optical scanners and magnetic record heads. The fundamental task of the electronic interface is to produce a current through the magnetic heads and to alter the direction of the current at the precise time when a recorded dot is desired on the magnetic tape so that a latent magnetic image corresponding to the optically scanned original hard copy is produced. When the direction of the current is reversed from its previous direction of flow through the magnetic write heads, a magnetic field gradient is generated. Precise timing is required in order to achieve proper phase alignment of pixels in adjacent record tracks on the magnetic tape in order to prevent cancellation of the magnetic field between the tracks. The track-to-track phasing is controlled by very accurate tape speed controls that are well known in the helical scan video recording art.

The control circuitry gains all its timing information to synchronize the recording from a three channel optical encoder (1000 bits/revolution in Channel One, one bit/revolution in Channel Two and four bits/revolution in Channel Three). The encoder can be mounted at any convenient location on shaft 9. The outputs (TTL compatible) are a squarewave 1000 times the revolution per second of rotational member 12 (hereinafter, the encoder clock), one pulse per revolution (hereinafter, the homing pulse) and four pulses per revolution (the head clock).

Figure 4:
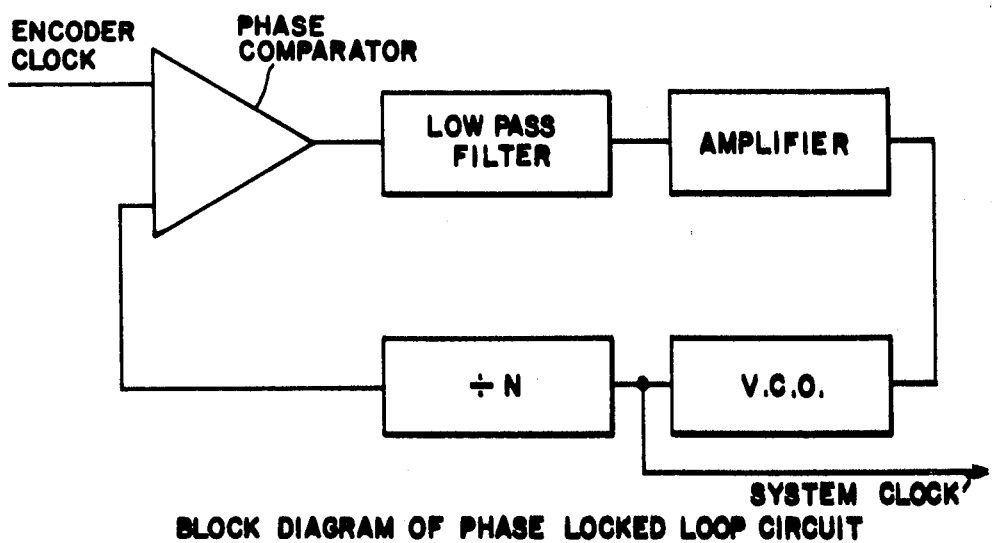
FIG. 4 is a block diagram of a phase locked loop circuit of the electronic interface.
Figure 5:
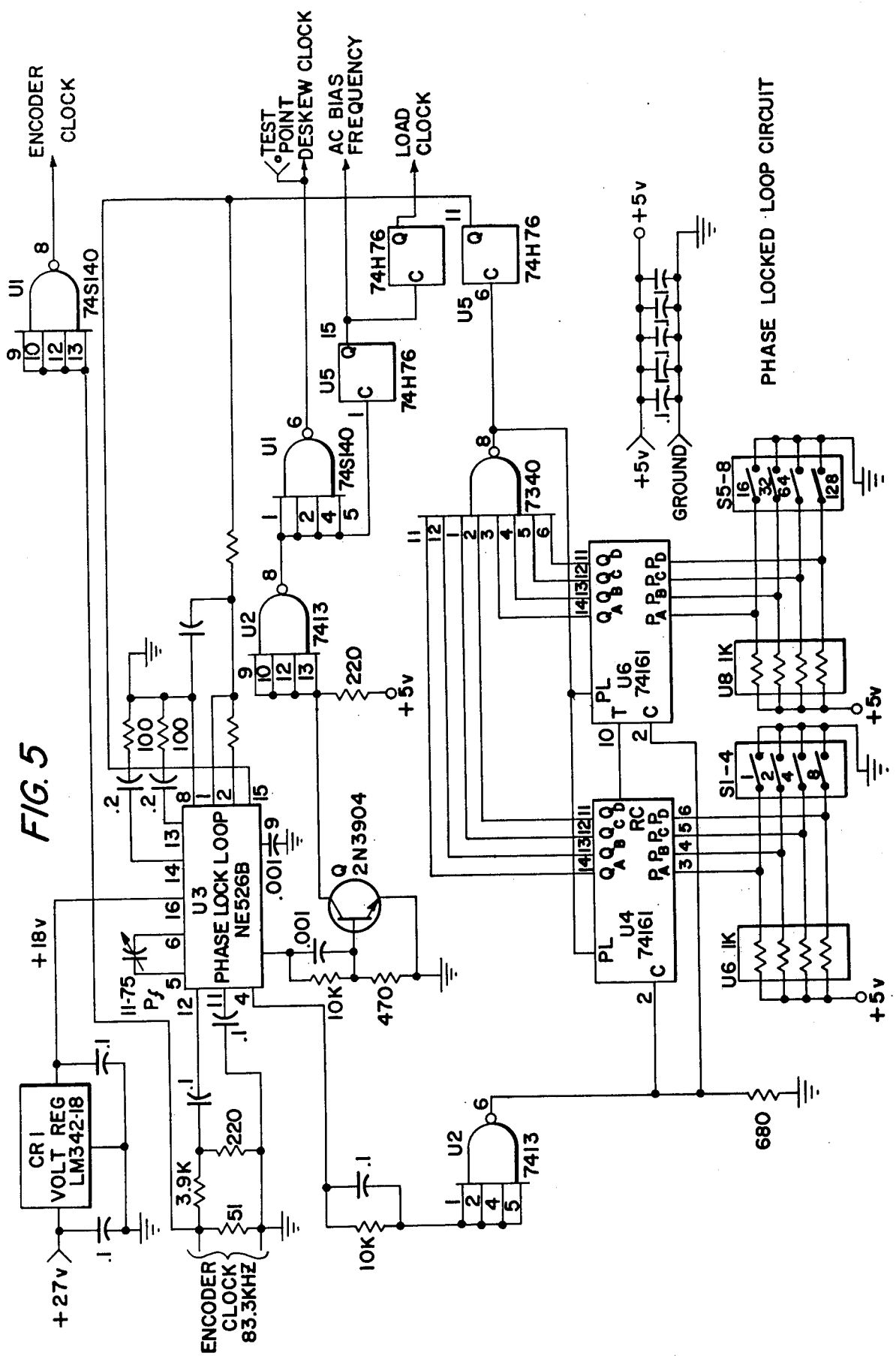
FIG. 5 is a circuit diagram of the phase locked loop circuit.

The system clock is locked to the angular velocity of rotational member 12 by the Phase-Locked Loop of FIGS. 4 and 5 (hereinafter, PLL). The PLL circuit is a feed back system comprised of a phase comparator, low pass filter, error amplifier, voltage-controlled oscillator (hereinafter, VCO) and divide-by-$n$ circuit. The PLL's input is the encoder clock and its output is the system clock which is a multiple of the input signal. In short the basic operation of the system is that an input signal is applied to the phase comparator which compares the phase and frequency of the input with the VCO frequency divided by $n$. An error voltage is generated that is related to the phase and frequency difference between the two signals. This error voltage is then filtered, amplified and applied to the control terminal of the VCO. In this manner, the control voltage forces the VCO frequency to vary in a direction that reduces the frequency difference between the two frequencies. When the two frequencies are sufficiently close, the feedback nature of the PLL causes the two to be synchronized or locked. Once in lock the VCO frequency is identical to the input signal except that it is actually running at a multiple of the input frequency.

By dividing the system clock down by various values, all other freqencies for the image control system are obtained. Table 1 shows a typical set of frequencies and the division factors.

Table I

Image Control System Frequencies

| | | |
|---|---|---|
| Deskew Clock | = | System Clock (9.66 MHz) |
| Erase Clock | = | 1/2 of System Clock (4.83 MHz) |
| Load Ram Clock | = | 1/4 of System Clock (2.41 MHz) |
| Unload Ram Clock | = | 1/16 of System Clock (604 KHz) |
| Write Driver Clock | = | 1/32 of System Clock (302 KHz) |
| Encoder Clock | = | 1/116 of System Clock (83.3 KHz) |

The multiple factor of the PLL circuit is determined by the ratio required between the system and encoder clocks for a particular wavelength and this ratio can be varied. Two adjustments are to be made to the circuit: (1) the center frequency of the VCO is aligned near the new system clock center frequency by adjusting C1 with no input applied, and (2) N (an 8 bit binary number on switches $S_1$LSB - $S_8$MSB) must be set equal to:

$$N = 256 - n/2,$$

where $n$ equals the desired multiplication factor of the PLL circuit.

Figure 7:
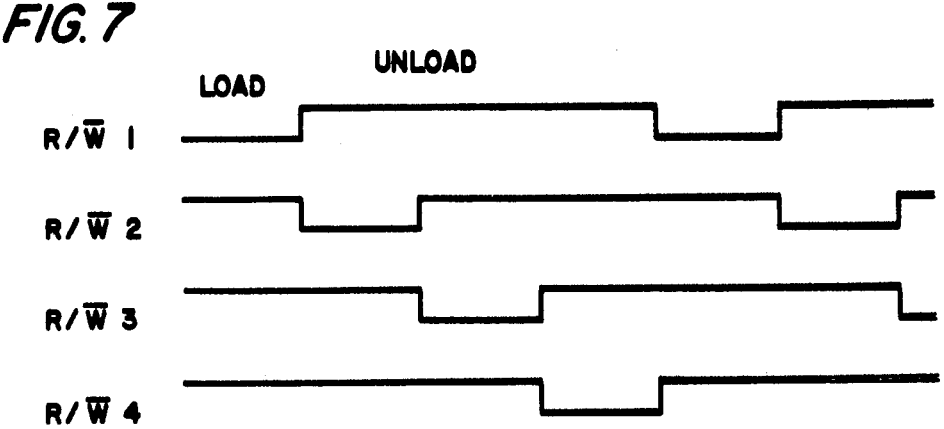
FIG. 7 is a timing diagram of memory load and unload cycles.
Figure 6:
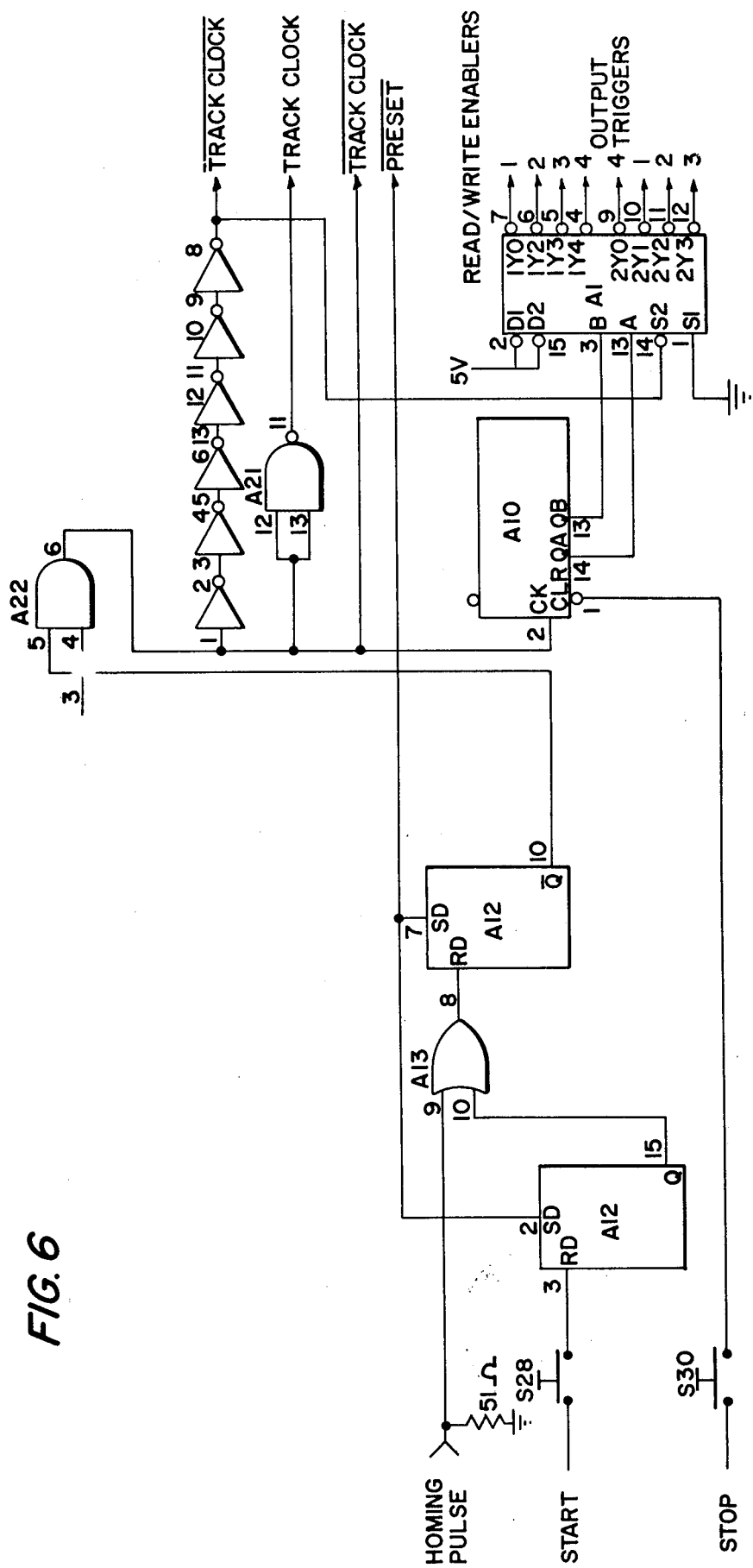
FIG. 6 is a system timing circuit diagram.

The system timing circuit supplies the enables and triggers required to operate the remaining circuits of the electronic interface. It is shown in FIG. 6. It has four inputs and ten outputs. The stop button S30 ends the recording mode and sets the logic to its proper state to begin another recording. The start button S28 triggers flip-flop A12 which resets the Q output low enabling the next homing pulse to start a recording. The homing pulse which is a high going low (H→L) rests the $\bar{Q}$ output of A12 to a high. This enables the head clock to generate the track clock which begins the recording. The track clock goes to a binary counter chip A10 which is used to address a dual 2-line-to-4-line decoder. The decoder A1 has two sets of outputs. Only the line selected by the applied address is able to go low when the enable is proper for that half of the decoder. The outputs 1Y0 - 1Y3 are the enable lines for the memory input and output timing circuits with an enable being low during the load period and high during the unload period. The second half's outputs 2Y0 - 2H3, which are only enabled during the A11 output pulse width, are used to start the deskew circuits. FIG. 7 shows the output levels of R/$\overline{W}$ enable lines with respect to load and unload times. Two other outputs come off this circuit. One is the preset for the system and the second is the track clock (TC) which is the output of A11 and goes to the electronic halftoning circuit and memory input timing circuit.

Figure 8:
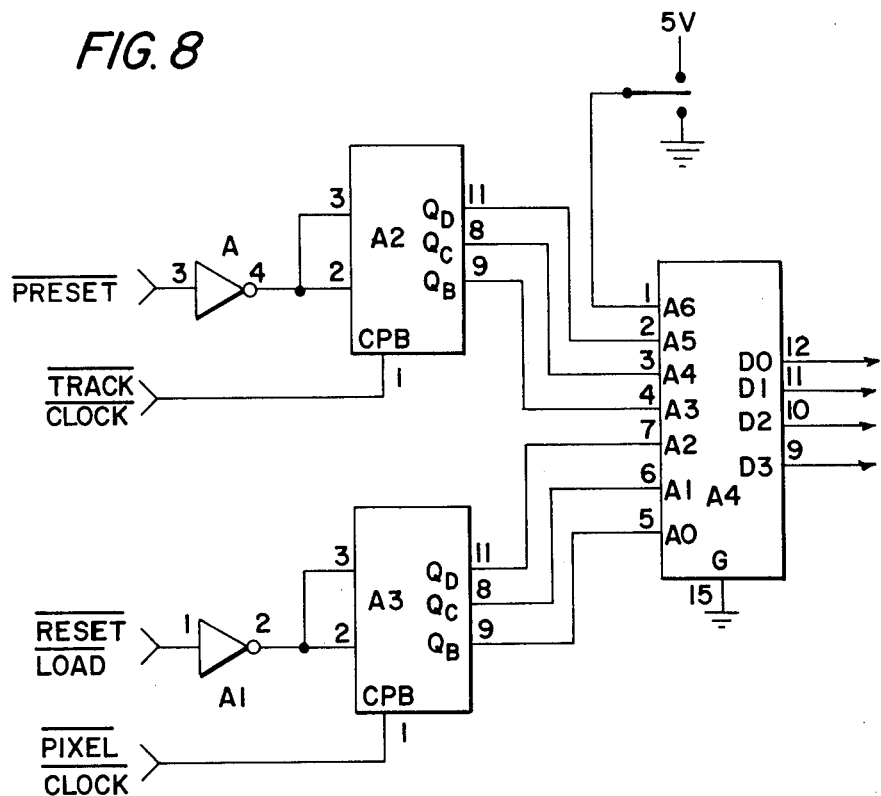
FIG. 8 is a diagram of an electronic halftoning circuit.

The electronic halftoning circuit, shown in FIG. 8, generates reference halftoning levels which are later compared with the desired image level to be recorded. The levels are set in PROM A4. The address of A4 have three input sources. Two (A2 and A3) are BCD counters which count the track and pixel clocks, respectively. The third is a switch which activates the electronic halftoning circuit.

Figure 9:
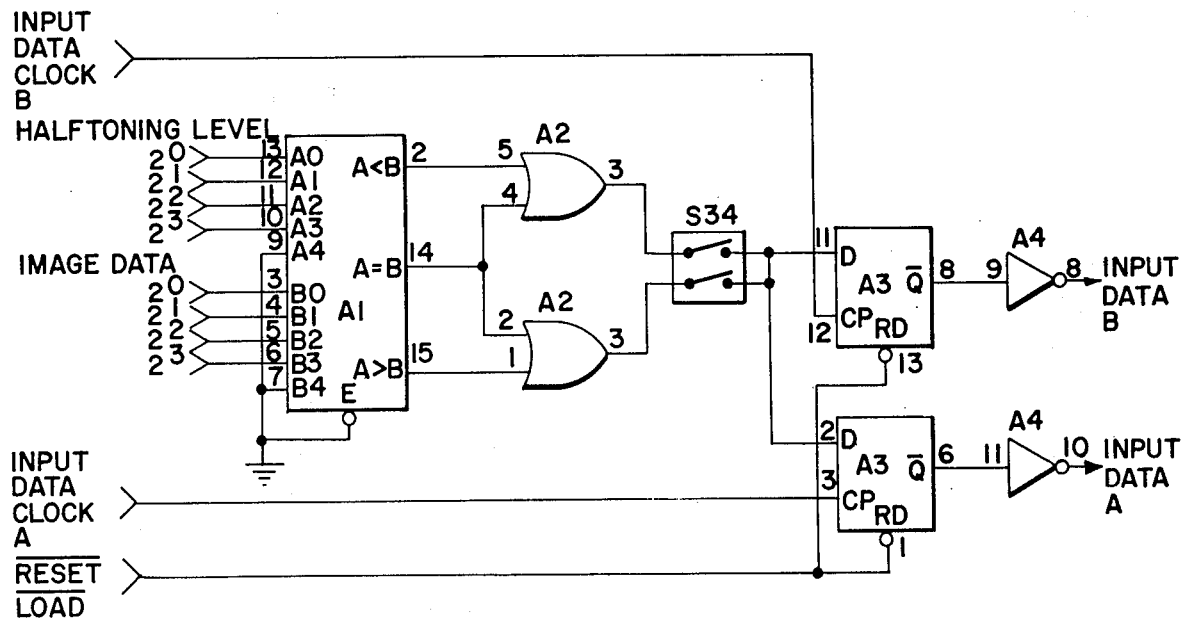
FIG. 9 is a circuit diagram for a comparator circuit which compares the image data to an electronic halftoning level selected to determine if a pixel should be written by magnetic record heads.

The comparator circuit of FIG. 9 with its inputs from the optical scanner and the electronic halftoning circuit (A0-A3) determines if a pixel should be written in that area of the magnetic image. By changing the settings on S34 a positive or negative image can be recorded. The input data clocks, two clocks 180° out of phase, and ½ the rate of the load clock are used to load the output of the comparator (A1) into data flip-flops A3.

Figure 10:
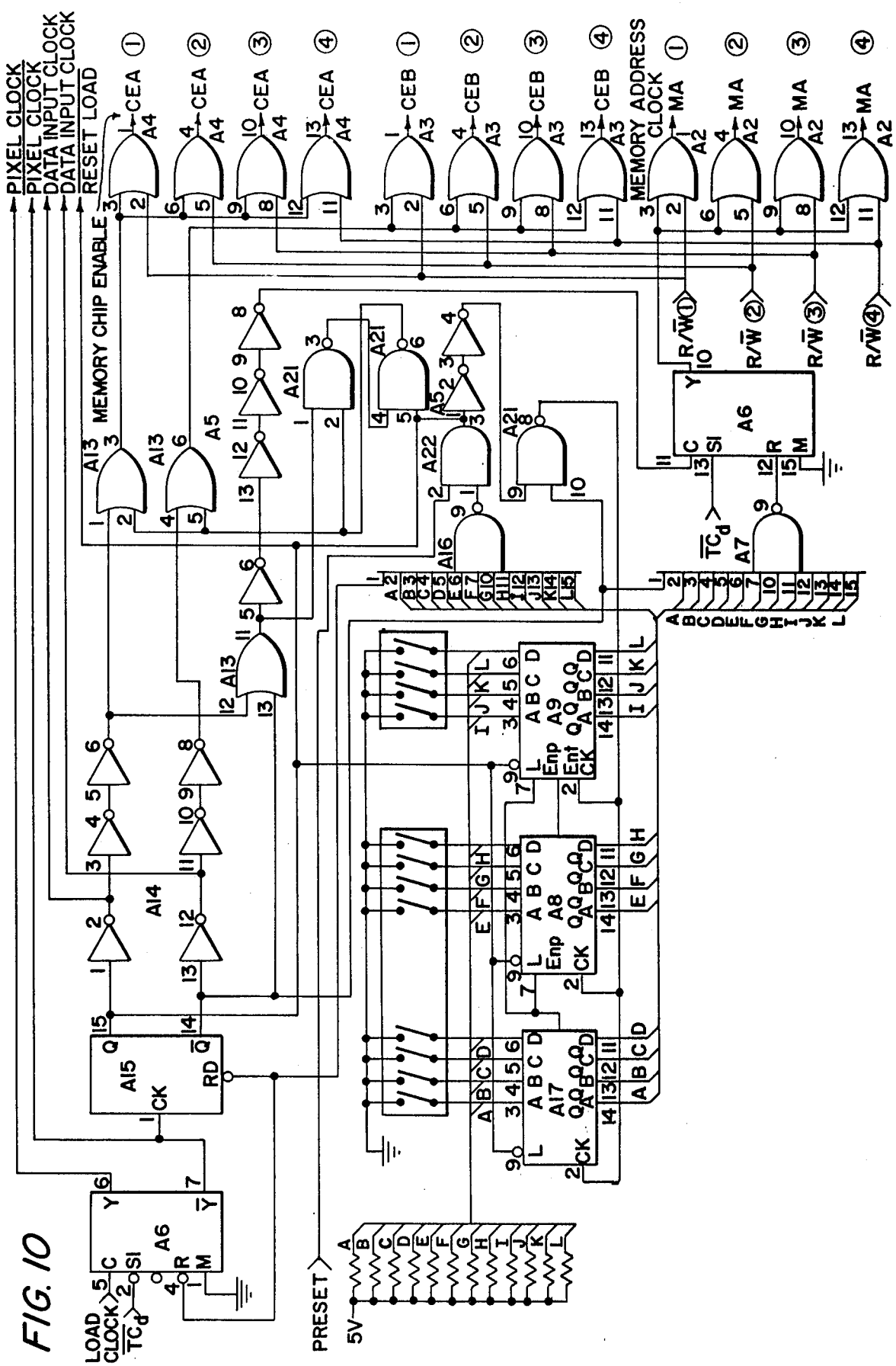
FIG. 10 is a circuit diagram of memory input timing.

The memory input timing circuit of FIG. 10 generates the signals required to load the data output of the comparator into an 8K buffer memory. The circuit has 4 inputs and 6 sets of outputs. A preset is used to prepare the circuit to begin a load cycle in one of the 4 memory buffers. The memory buffer in which the load cycle is occurring is selected by a low level signal on its R/$\overline{W}$ enable line. A load cycle required ¼ of a revolution of the head wheel and begins with buffer 1. The sequence of buffers followed is then 2, 3, 4, 1, 2, etc. until the recording is complete. A load cycle is begun by a high to low signal transition on the track clock delayed ($\overline{TCd}$) which initiates pulse synchronizer A6. The input to A6 is the load clock which is ¼ of the system clock. The output, the pixel clock, is counted up by A8, A9 and A17 and when binary 4095 is reached the circuit is reset by the reset load signal and awaits another high to low signal transition on the $\overline{TCd}$. The number ($n$) of pixels in each track is determined by 2 × (4096 − N) where N is the number preloaded into the counters by SA LSB - SL MSB. The remaining sets of outputs are generated by dividing the pixel clock by 2. The input data clocks go to the comparator circuit and load the data on data flip-flops. The memory chip enables (CEA1 - CEA4, CEB1 - CEB4) are the chip enables for the 8 RAMs.

Figure 11:
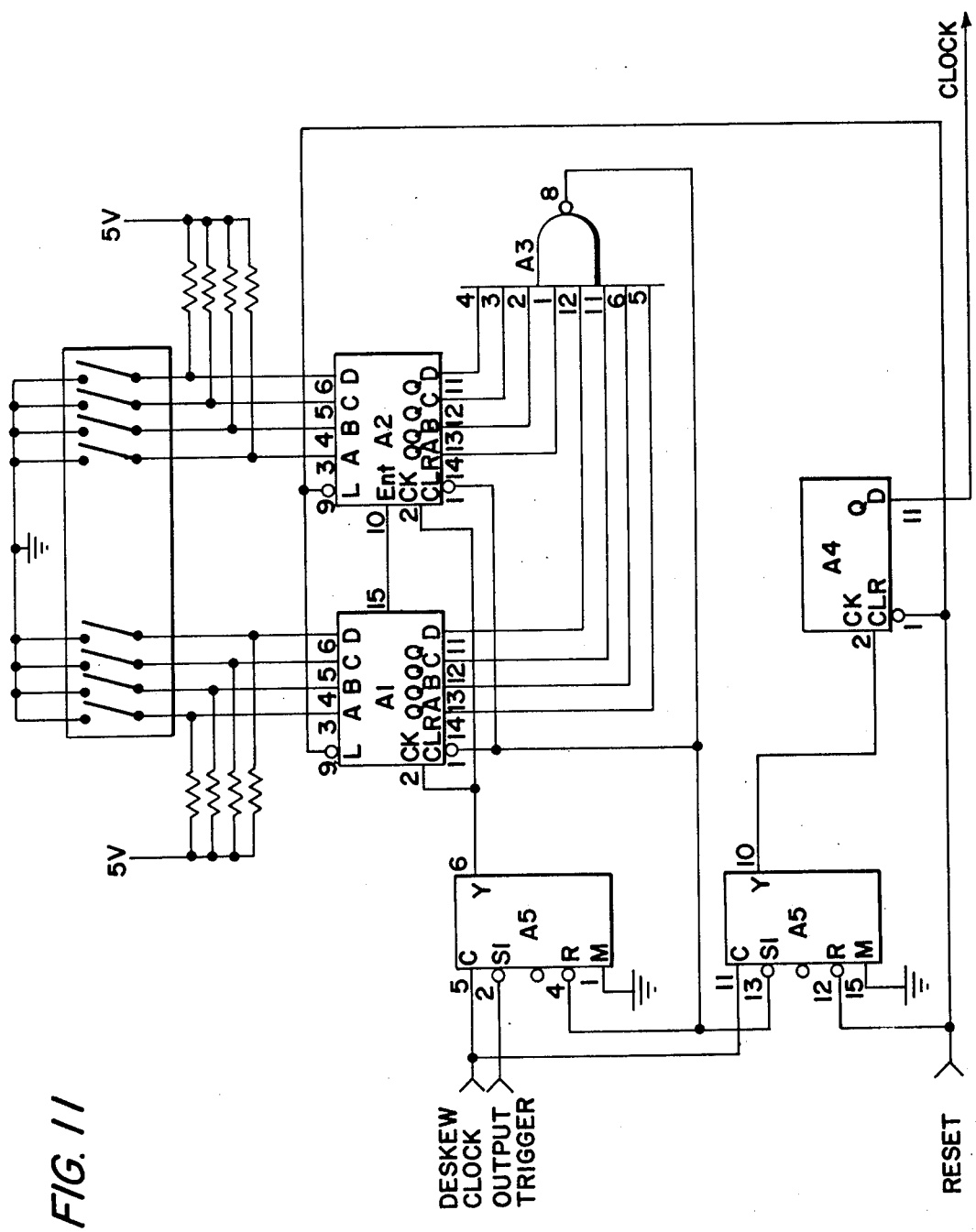
FIG. 11 is a diagram for deskew circuitry.

The deskew logic provides the unload clock for the memory. The deskew circuit is shown in FIG. 11. The output trigger generates a delayed pulse which is used to initiate the unload or record cycle. Once begun, the deskew frequency is passed by the pulse synchronizer (A5) with the output divided-by-16 by A4 to create the unload clock. The time between the output trigger and the initiation of the unload can be varied by the number set on the switches at the parallel data inputs of A1 and A2. This variable delay allows greater tolerance on the exact location of the record heads around the outer circumference of the head wheel with respect to the scanning element 11. The circuit is reset by a signal created in the memory and output timing circuit.

Figure 12:
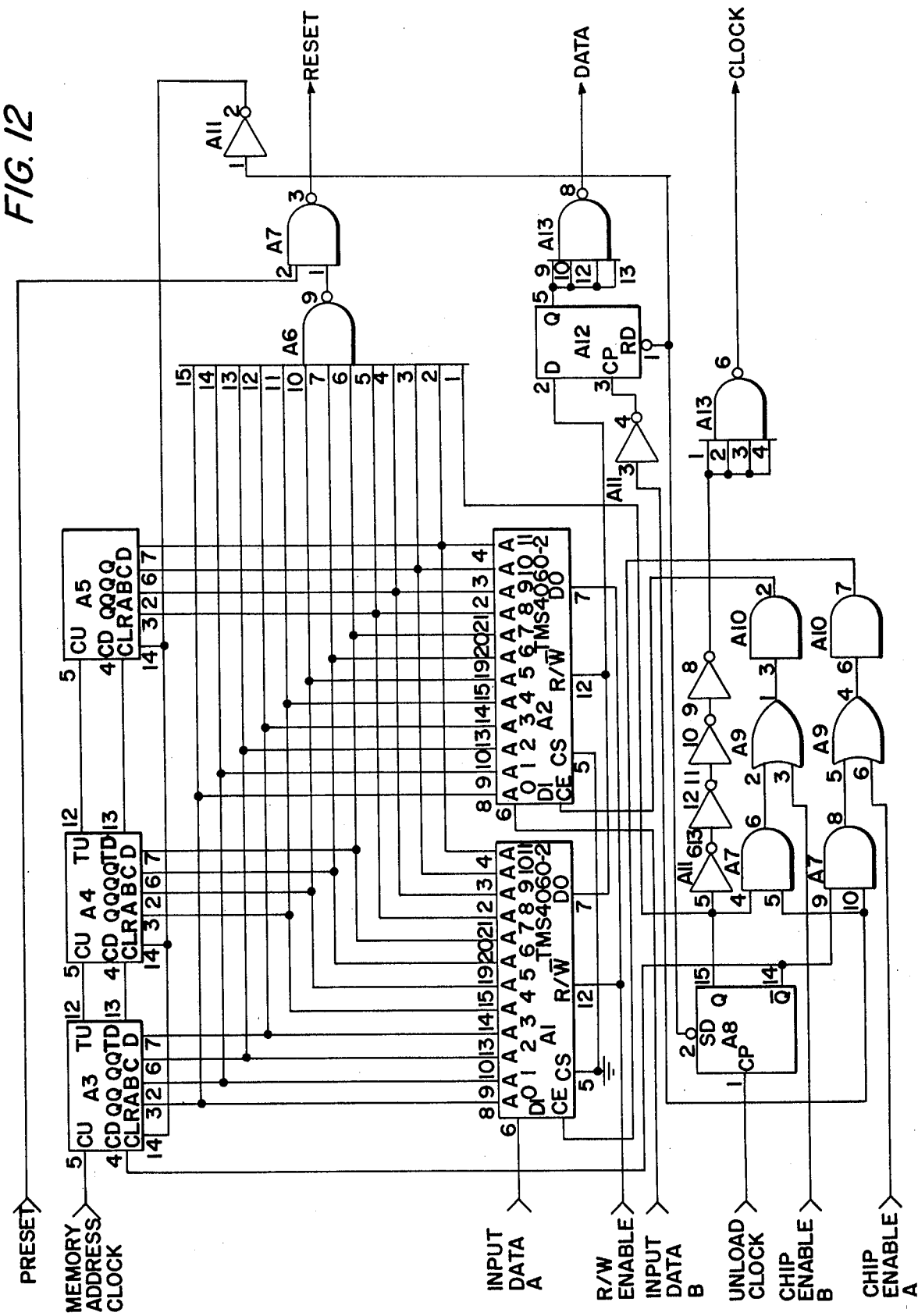
FIG. 12 is a circuit diagram of memory and output timing.

All of the inputs to the memory and output timing circuit have been discussed. The memory and output timing circuit itself is shown in FIG. 12. Each buffer has two 4K RAMs (TMS 4060-2). The buffer handles data as first-in-last out. During loading and unloading the data is alternated between the two RAMs in each buffer which doubles the effective speed of the buffer. The unload chip enables and memory address clocks are generated from the unload clock just as the load signals are generated on the memory input timing circuit. The load and unload chip enables are then gated together and applied to their respected RAMs. The memory address clock for the load cycle (four times the unload clock) is applied to the count-up input of the binary counters (A3-A5) that address the RAMs. The memory address clock for the unload cycle is applied to the count-down input of the binary counters (A3-A5). When the address to the RAM is counted down to $1FFF_{16}$ the output of the 13 input NAND gate generates the reset output that marks the end of the unload cycle and resets the circuits for the next load cycle. The unload clock is used to load the data flip-flop when the data is valide at the output of the RAMs. The unload clock is also delayed and, with the data, is outputed to the write driver.

Figure 13:
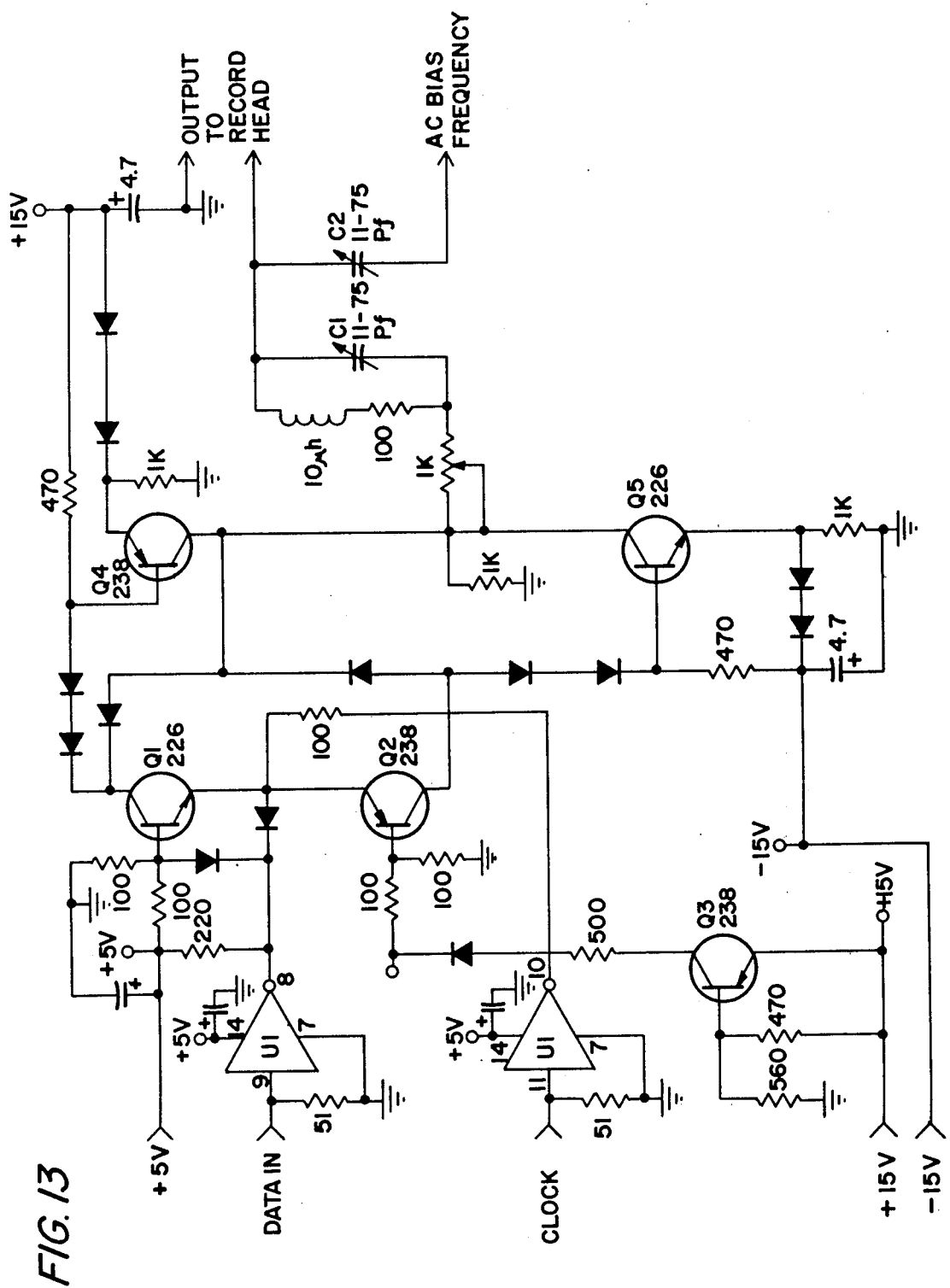
FIG. 13 is a circuit diagram for magnetic record head drivers.

The write driver circuit of FIG. 13 employs the AC bias method of recording. The circuit gates the clock and data together and then sums the bias frequency. The bias frequency will erase the magnetic tape when the data applied to the circuit is high. The circuit has three settings. C1 and R1 set the level of the data, and C2 sets the level of the bias frequency.

Optical encoder 6 can be obtained from Renco Corporation of Galeta, California. The resistances depicted in the drawings are in ohms and the capacitances depicted in the drawings are in microfarads, unless otherwise noted. All integrated circuit components can be obtained under the item numbers indicated in the drawings from either Texas Instruments Corporation of Fairchild Corporation. The analog to digital converter interfacing the optical scanner with the comparator (FIG. 3) is well known in the art and need not be elaborated upon. The design and availability of such converters is well established as is evidenced from Fundamentals and Applications of Digitalogic Circuits, Sol Libes, Hayden Book Company, 1975, pages 138 et seq.

It will be appreciated that other modifications and ramifications of the present invention will occur to those skilled in the art upon a reading of the present disclosure. For example, while the preferred embodiment described and shown in the Figures utilizes integrated circuitry, it will be appreciated that equivalent circuitry comprised of discrete components can be utilized. Furthermore, it would be appreciated that the invention can be applied equally to any number of optical scanners and magnetic record heads by appropriately modifying the circuitry in accordance with the practice of the present invention.

Moreover, the optical scanner can comprise a flying spot scanner such as that dislcosed in U.S. Pat. No. 3,973,825, hereby expressly incorporated by reference.

The system can be automated by replacing the various switches in the system with a micro-processor such as an MC-6800. A program loaded in a ROM can be used to control the micro-processor. Information from the optical scanner could be inputted into a computor's memory for storage and retrieved for processing by the electronic interface at a later time. The tie point for the computer interface is the output line of the comparator.

Another variation that will be appreciated by one skilled in the art includes the use of a magnetizable sheet transport web and a magnetizable sheet in place of magnetic tape 7, similar to the document transport web 5 and original document 6 arrangement of FIG. 1.

What is claimed is:

1. A magnetic recorder for optically scanning an original document and for producing a latent magnetic image thereof, comprising: a transparent cylinder within which is located an optical scanning element positioned to optically scan an original document transported around the circumference of said transparent cylinder in helical-wrap configuration; a second cylinder in substantial longitudinal alignment with said transparent cylinder and within which is located a rotational member having at least one magnetic record head mounted thereon, said rotational member positioned within said second cylinder to magnetically record a magnetizable member transported around the circumference of said second cylinder in helical-wrap configuration; means for rotating said optical scanning element and said rotational member without substantial translation thereof; and, means for converting signals from said optical scanning element into reversals of electric current flow through said at least one record head including deskew circuit means and a data buffer for said magnetic record head, said deskew circuit means electrically connected to provide a signal to initiate the unloading of each data buffer at a time effective to substantially align pixels recorded in adjacent tracks.

2. The magnetic recorder of claim 1, wherein said means for converting signals from said optical scanning element into reversals of electric current flow through said magnetic record head further includes half-toning circuit means for providing said reversals of electric current flow through said magnetic record head in a sequence effective to record a half-tone latent magnetic image.

3. The magnetic recorder of claim 1 wherein said means for rotating said optical scanning element and said rotational member comprises a common rotational shaft.

4. The magnetic recorder of claim 1 wherein said means for rotating said optical scanning element and said rotational member comprises separate rotational shafts having a common connection.

* * * * *